United States Patent
Wengelnik et al.

(10) Patent No.: US 10,235,015 B2
(45) Date of Patent: Mar. 19, 2019

(54) METHOD FOR CONTROLLING A DISPLAY SURFACE OF AN OPERATOR CONTROL DEVICE AND OPERATOR CONTROL DEVICE IN A VEHICLE

(71) Applicant: VOLKSWAGEN AG, Wolfsburg (DE)

(72) Inventors: Heino Wengelnik, Wolfsburg (DE); Andreas Medler, Lengede (DE)

(73) Assignee: Volkswagen AG (DE)

(*) Notice: Subject to any disclaimer, the term of this patent is extended or adjusted under 35 U.S.C. 154(b) by 407 days.

(21) Appl. No.: 14/889,721

(22) PCT Filed: Apr. 29, 2014

(86) PCT No.: PCT/EP2014/058718
§ 371 (c)(1),
(2) Date: Nov. 6, 2015

(87) PCT Pub. No.: WO2014/180715
PCT Pub. Date: Nov. 13, 2014

(65) Prior Publication Data
US 2016/0110033 A1    Apr. 21, 2016

(30) Foreign Application Priority Data

May 10, 2013   (DE) .................. 10 2013 008 074

(51) Int. Cl.
*G06F 3/048*   (2013.01)
*G06F 3/0482*  (2013.01)
(Continued)

(52) U.S. Cl.
CPC ............ *G06F 3/0482* (2013.01); *B60K 37/06* (2013.01); *G06F 3/0488* (2013.01);
(Continued)

(58) Field of Classification Search
CPC .............. G06F 3/04101; G06F 3/0416; G06F 2203/04101; B60K 2350/00; B60K 37/06
See application file for complete search history.

(56) References Cited

U.S. PATENT DOCUMENTS

2012/0105349 A1* 5/2012 Hauschild ............ B60K 35/00
                                                       345/173
2012/0268404 A1* 10/2012 Kuhn ................... B60K 35/00
                                                       345/173

FOREIGN PATENT DOCUMENTS

CN    101784412 A    7/2010
CN    101835652 A    9/2010
(Continued)

OTHER PUBLICATIONS

Office Action for Chinese Patent Application No. 2014800221356; dated Dec. 20, 2016.
(Continued)

*Primary Examiner* — Claudia Dragoescu
(74) *Attorney, Agent, or Firm* — Barnes & Thornburg LLP

(57) ABSTRACT

A method for controlling a display surface of an operator control device in a vehicle, wherein data for a menu structure having menus in different levels is stored in a memory and the presence of an actuating object in a detection region is detected and the menus of the menu structure include a subsurface for displaying vehicle-specific information, wherein the subsurface having the vehicle-specific information is displayed or modified in the associated menu on the display surface only if it is detected that the actuating object enters into the detection region or exits from the detection region. Also disclosed is a corresponding operator control device in the vehicle for performing the method.

14 Claims, 7 Drawing Sheets

(51) Int. Cl.
*B60K 37/06* (2006.01)
*G06F 3/0488* (2013.01)

(52) U.S. Cl.
CPC ............... *B60K 2350/1004* (2013.01); *B60K 2350/1012* (2013.01); *B60K 2350/1028* (2013.01)

(56) References Cited

FOREIGN PATENT DOCUMENTS

| DE | 19941956 | A1 | 3/2001 |
|---|---|---|---|
| DE | 10037810 | A1 | 2/2002 |
| DE | 102004033275 | A1 | 2/2006 |
| DE | 102004045885 | A1 | 3/2006 |
| DE | 102006032118 | A1 | 1/2008 |
| DE | 102007023290 | A1 | 11/2008 |
| DE | 102007054239 | A1 | 5/2009 |
| DE | 102008026488 | A1 | 12/2009 |
| DE | 102009019561 | A1 | 11/2010 |
| DE | 102009036369 | A1 | 2/2011 |
| DE | 102009051202 | A1 | 5/2011 |
| DE | 102010032221 | A1 | 1/2012 |
| DE | 102010034541 | A1 | 2/2012 |
| DE | 102010055795 | A1 | 6/2012 |
| DE | 102011116120 | A1 | 4/2013 |
| JP | 2011523388 | A | 8/2011 |
| KR | 20060053436 | A | 5/2006 |
| WO | 2011051361 | A1 | 5/2011 |
| WO | 2013053466 | A2 | 4/2013 |

OTHER PUBLICATIONS

Search Report for German Patent Application No. 10 2013 008 074.6; dated Mar. 14, 2014.
Search Report for International Patent Application No. PCT/EP2014/058718; dated Aug. 26, 2014.
Office Action for Korean Patent Application No. 10-2015-7034875; dated Apr. 19, 2017.

* cited by examiner

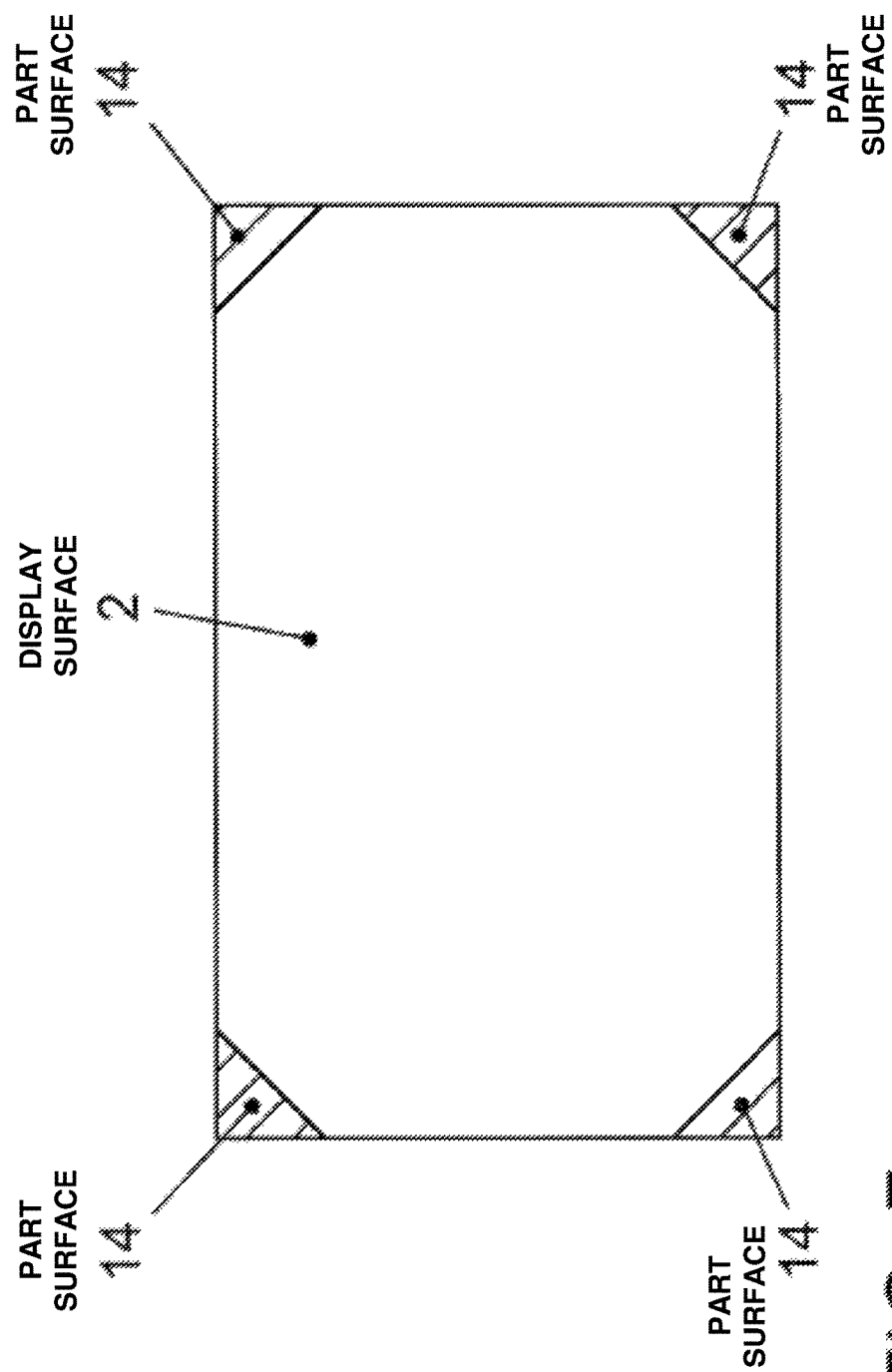

METHOD FOR CONTROLLING A DISPLAY SURFACE OF AN OPERATOR CONTROL DEVICE AND OPERATOR CONTROL DEVICE IN A VEHICLE

PRIORITY CLAIM

This patent application is a U.S. National Phase of International Patent Application No. PCT/EP2014/058718, filed 29 Apr. 2014, which claims priority to German Patent Application No. 10 2013 008 074.6, filed 10 May 2013, the disclosures of which are incorporated herein by reference in their entirety.

FIELD

Illustrative embodiments relate to a method for controlling a display surface of an operator control device in a vehicle. Data regarding a menu structure are stored in a storage device, the data comprising various menus, in particular data regarding a hierarchical menu structure that comprises menus in various levels. In addition, the illustrative embodiments relate to an operator control device in a vehicle, the operator control device having a display surface and a storage device, wherein the above mentioned data are stored. In addition, the operator control device comprises a control device that is coupled to the storage device and the display surface and graphic data can be generated by means of the control device for display on the display surface. Furthermore, the operator control device comprises a proximity detecting device for detecting the length of time an actuating object is in a detection region.

BACKGROUND

In a vehicle, there are various information and communication devices whose displays and information must be displayed. The size of the display surfaces that can be integrated in the vehicle so that in particular the driver of the vehicle can read the display is very limited. To clearly display the many operator and display possibilities, for example hierarchical menu structures are used. A hierarchical menu structure includes a multiplicity of menus that in each case are allocated various menu points, alphanumerical information displays and/or graphics. When selecting a menu point, a menu of a lower level of the hierarchical menu structure opens, a so-called sub menu. This sub menu in turn comprises multiple sub menu points. This structure can be continued across multiple hierarchical levels so that there are complex ramifications for the display on the display surface.

Despite the complexity of the menu structure, the operator control device in the vehicle is to be operable by the user in a simple and intuitive manner. In addition, it is necessary to impart features of the vehicle type to the occupants of the vehicle, in particular to the driver. By way of example, in the case of a vehicle type having a particularly powerful motor, it is known to tailor the interior and in conjunction therewith also the displays of the operator control device to suit this vehicle type and to differentiate between the vehicle type and vehicles that are in the identical model range but comprise a less powerful motor. In addition, it is necessary to differentiate between vehicles that comprise an electrical drive motor for locomotion with the vehicle and conventional vehicles.

Illustrative embodiments provide a method and an operating device of the type mentioned in the introduction, wherein information of a menu structure is displayed to the user in such a manner that this information can be easily detected but likewise vehicle-specific information can be conveyed to the user.

BRIEF DESCRIPTION OF THE FIGURES

Disclosed embodiments are explained with reference to the drawings.

FIGS. 4 to 7 illustrate schematically displays on the display surface of the operator control device, the displays having been generated by an exemplary embodiment of the disclosed method.

DETAILED DESCRIPTION OF THE DISCLOSED EMBODIMENTS

Figure 1:
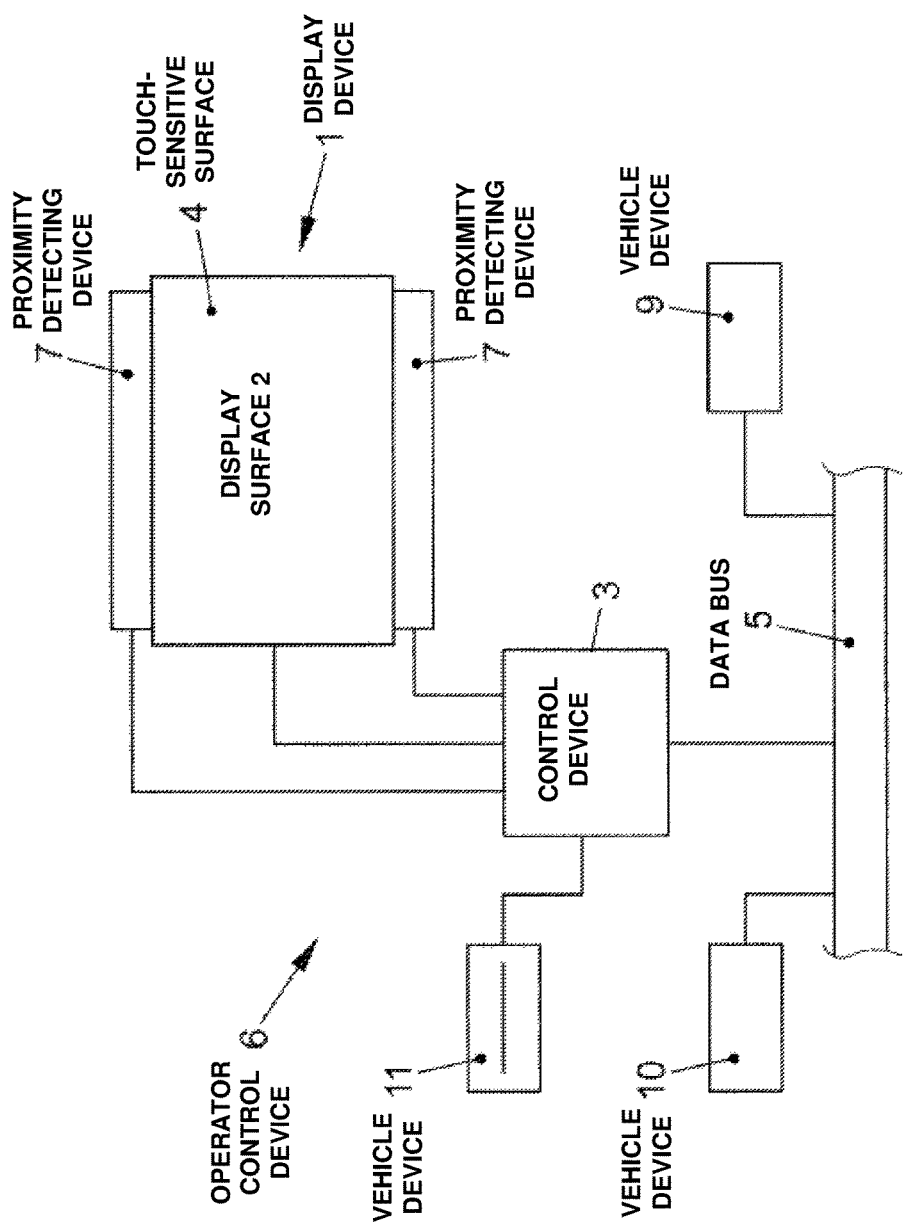
FIG. 1 illustrates schematically an exemplary embodiment of the operator control device and the connection of this operator control device to other devices of the vehicle.

In the case of the disclosed method, the length of time an actuating object is in a detection region is detected. In addition, the menus of the menu structure include a part surface for displaying vehicle-specific information. In the case of the disclosed method, the part surface having this vehicle-specific information is only then displayed or changed in the associated menu on the display surface if it has been detected that the actuating object is entering the detection region or is exiting the detection region.

If, by way of example, no actuating object is located in the detection region and also it is not detected that an actuating object of this type is entering the detection region, the part surface having the vehicle-specific information is also not displayed on the display surface. As soon as an actuating object enters the detection region, the display of the current menu changes in such a manner that the part surface is displayed with the vehicle-specific information.

Alternatively, the part surface having the vehicle-specific information can then only be displayed if it has been detected that the actuating object is exiting the detection region. In this case, the part surface having the vehicle-specific information is not displayed as the actuating object is entering the detection region. Only when the actuating object is exiting the detection region is the part surface by way of example displayed for a specific time interval to temporarily convey the vehicle-specific information to the user.

In the case of a change to the part surface having the vehicle-specific information, which can occur in the case of the actuating object entering the detection region or in the case of the actuating object exiting the detection region, the part surface is enlarged in particular for a specific time to bring the vehicle-specific information to the attention of the user.

The vehicle-specific information can be by way of example a specific graphic, a specific image or a lettering that is only used in connection with a specific vehicle type. This vehicle-specific information can in particular indicate that the vehicle comprises an electric drive for the locomotion with the vehicle.

In accordance with at least one disclosed embodiment of the method, the part surface having the vehicle-specific information is displayed in the associated menu if it has been detected that the actuating object is located in the detection region. In a situation of this type, it is possible to conclude that the user intends to perform an operation. In this case, the user at least temporarily observes the display surface. The driver is repeatedly provided with a particular visualization for the type of the vehicle by means of the display of the part surface having the vehicle-specific information that in particular is displayed in connection with all the menus of the menu structure. If the actuating object is located outside the detection region, it can be concluded that the user does not intend to perform an operation. In this case, the part surface having the vehicle-specific information is in particular not displayed so that a larger display surface remains for displaying the current menu. As a consequence, the user can detect the information of the menu in a more rapid and simpler manner.

In accordance with at least one disclosed embodiment of the method, the part surface having the vehicle-specific information is displayed in the associated menu for a first time interval after the actuating object enters the detection region or for a second time interval after the actuating object exits the detection region. In particular, the two time intervals of these alternatives can be identical. In the case of the two alternatives, in a situation in which an actuation will be performed in the near future or in which an actuation has just been performed, the part surface having the vehicle-specific information is displayed to the user for a time interval. In this manner, the attention of the user is brought temporarily but repeatedly to the current type of the vehicle.

In accordance with a further disclosed embodiment of the method, the detection region is arranged in front of an input device. In this case, not only is the length of time an actuating object is in the detection region detected but also the position of the actuating object is detected. The part surface having the vehicle-specific information is in this case only then displayed or changed in the associated menu if it has been detected that the actuating object is approaching the input device or that the actuating object is at a distance from the input device. As a consequence, it is achieved that it can be even more precisely detected whether the user intends to perform an operation or whether the user has completed the input.

In accordance with a further disclosed embodiment of the method, the part surface for displaying the vehicle-specific information is displayed in the displays of all the menus. In this case, the type of the display of the vehicle-specific information changes if it has been detected that the actuating object is entering the detection region or is exiting the detection region. By way of example, the color of the display can change in the part surface. In addition, the size of the part surface can change, in particular the size can increase. As a consequence, the vehicle-specific information is continuously displayed to the user whilst displaying the menus. If, however, the actuating object is entering the detection region or is exiting the detection region, the vehicle-specific information is even more clearly highlighted.

Moreover, in the case of the disclosed method, inputs for the operator control device are detected. If, however, it has been detected that within a third time interval nothing had been input, a screensaver is displayed. This screensaver can comprise the display of the vehicle-specific information. If it has been detected that the actuating object is approaching the input device, the screensaver disappears and a menu appears in which if necessary the part surface for displaying the vehicle-specific information is displayed.

In accordance with a further disclosed embodiment of the method, the part surface is a switching element of the respectively displayed menu of the menu structure. The vehicle-specific information or further vehicle-specific information is displayed when this switching element is actuated. In the case of this embodiment, it is indeed achieved that the reference to the vehicle-specific information is included in the menu by means of the switching element. However, the vehicle-specific information is not displayed in full until the switching element is actuated. In this case, a larger display surface is available to display this information.

The term a "switching element" is to be understood in the scope of the disclosed embodiments as a control element of a graphic user interface. A switching element differs from elements and surfaces purely for displaying information, so-called display elements, in that the switching element can be selected. When a switching element is selected, its allocated function is performed. The function can only lead to a change of the information display. In addition, it is possible by way of the switching elements to control devices whose operation is supported by the information display. The switching elements can consequently replace conventional mechanical switches. The switching elements can be generated arbitrarily for a freely programmable display surface and can be displayed by the display surface. Furthermore, it can be provided that a switching element can be highlighted. In this case, the allocated function is still not performed. The marked switching element is however displayed in a highlighted manner with respect to other switching elements. Only when the switching element is selected is the allocated function of the switching element performed.

The actuating object that is used in the case of the disclosed method can be by way of example the tip of a finger of a user, a stylus or another different object. In the case of the disclosed method, in particular a display surface is used on which a touch-sensitive surface is embodied. Consequently, a so-called touchscreen is used.

The disclosed operator control device, includes the graphic data for displaying the menus of the menu structure can be generated by means of the control device in such a manner that a part surface having the vehicle-specific information is only then displayed or changed in the associated menu if it has been detected that the actuating object is entering the detection region or is exiting the detection region.

The disclosed operator control device is embodied in such a manner that the operator control device can in part or entirely perform the above mentioned method steps. It is possible to operate various devices of the vehicle by means of the operator control device. The disclosed operator control device comprises the identical above-mentioned features as the disclosed method.

The operator control device comprises an input device and the detection region is arranged in front of the input device. It is possible in this case to detect in particular the position of the actuating object in the detection region by means of the proximity detecting device. The input device comprises a touch-sensitive surface that is arranged on the display surface. Consequently, a so-called touchscreen is provided.

The proximity detecting device is known per se. The proximity detecting device can comprise by way of example a reflection light barrier that comprises at least one light-emitting means for determining electromagnetic detection radiation in the detection region, and a receiving element for detecting a portion of the detection radiation that is scattered and/or reflected on the actuating object. The proximity detecting device can be embodied in particular so as to identify the actuating object in the detection region with reference to the intensity of the detection radiation that is received. In addition, the proximity detecting device can comprise various light-emitting means for the individual detection zones, the light-emitting means in each case emitting electromagnetic detection radiation in the respective detection zone. In addition, a modulation device for modulating the detection radiation that is emitted can be provided so that the detection radiation that is emitted in the individual detection zones differs in each case regarding its modulation. In this case, the proximity detecting device can also comprise an analysis unit that is embodied in such a manner that the reflected and/or scattered detection radiation that is received can be analyzed regarding its modulation to determine in which detection zone the detection radiation was scattered or reflected on an actuating object.

Furthermore, the disclosed embodiments relate to a vehicle having the operator control device. The display surface is arranged in this case in such a manner that the display surface can be easily reached by the driver and/or the passenger. By way of example, the display surface is arranged in the center console of the vehicle.

Figure 2:
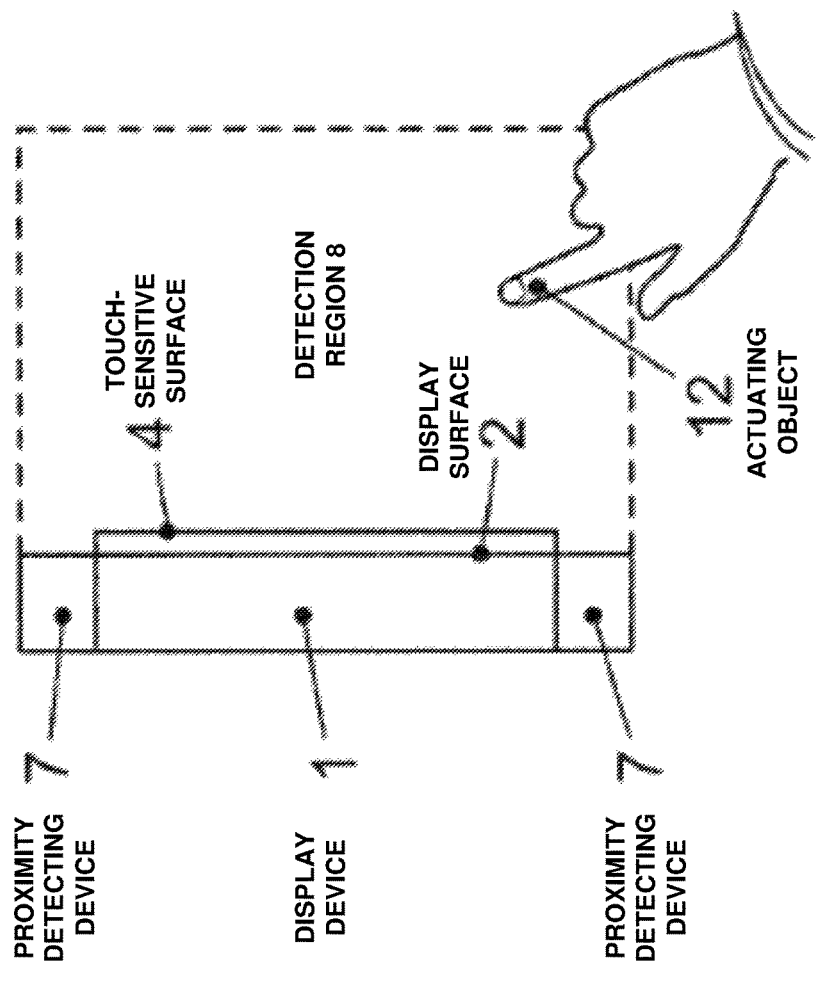
FIG. 2 illustrates a sectional view of the display device of the exemplary embodiment of the operating device.
Figure 3:
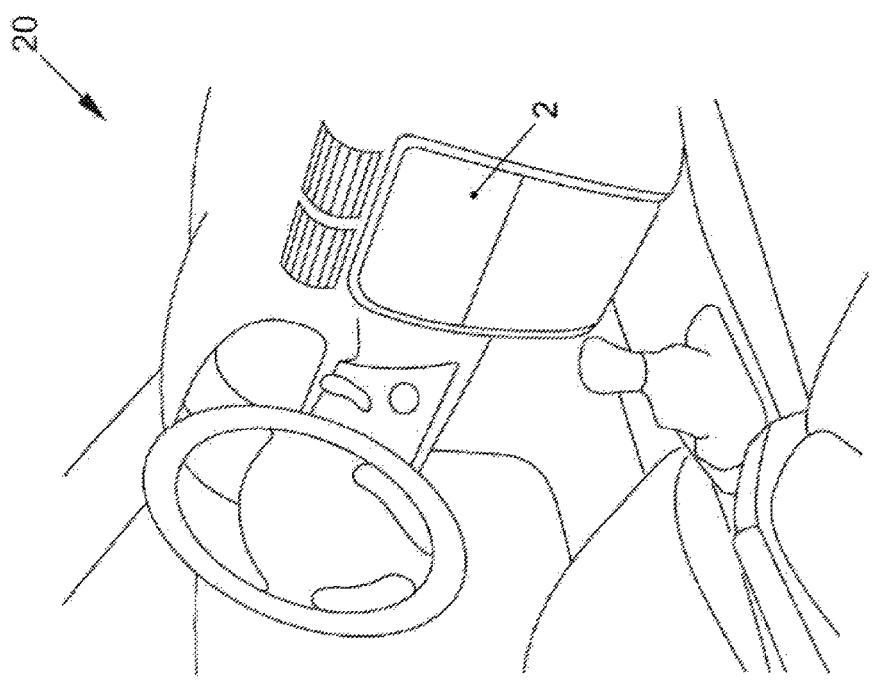
FIG. 3 illustrates a vehicle having the exemplary embodiment of the operator control device.

With reference to the FIGS. 1 to 3 initially an exemplary embodiment of the operator control device 6 and its arrangement in a vehicle 20 is explained:

The operator control device 6 comprises a display device 1 having a display surface 2 that is arranged in the interior of the vehicle 20 in such a manner that the display surface is easily visible for at least one occupant of the vehicle, in particular the driver. The display surface 2 can be provided by a display, in particular a liquid crystal display, in an arbitrary construction form.

In addition, the operator control device 6 comprises a control device 3 and an input device 4. The control device 3 is connected to the display device 1. Graphic data for displaying information on the display surface 2 can be generated using the control device 3. The input device is embodied as a touch-sensitive surface 4 on the display surface 2. Consequently, a so-called touchscreen is provided.

Furthermore, the operator control device 6 comprises a proximity detecting device 7. The length of time an actuating object 12 is in a detection region 8 and the position of an actuating object 12 in the detection region is detected by means of the proximity detecting device 7. The detection region 8 is illustrated in FIG. 2 in detail. The detection region 8 is formed in such a manner that it is detected on the display surface 2 that an actuating object 12 is approaching the touch-sensitive surface 4.

In the exemplary embodiment that is described in this case, the detection region 8 forms at least one volume in front of the operator surface 4. In particular a cuboid is formed that entirely encompasses the touch-sensitive surface 4 with its side surfaces in the extension direction that extends parallel to the touch-sensitive surface 4. In a direction perpendicular to the touch-sensitive surface 4, the cuboid extends from the touch-sensitive surface 4 or directly in front of the touch surface 4 to a spacing of for example approximately 40 cm. The spacing of the outer limit of the detection region 8 in front of the touch-sensitive surface 4 is selected in such a manner that an approach to the touch-sensitive surface 4 can be promptly detected in such a manner that the display on the display surface 2 can be changed sufficiently early to support the user when inputting information. In addition, the spacing of the detection region 8 from the touch-sensitive surface 4 should be selected in such a manner that the actuating object 12 or another object is moved as seldom as possible into the detection region 8 if an operation of the touch-sensitive surface 4 is not intended.

Further details regarding various embodiments of the proximity detecting device 7 are described by way of example in WO 2011/051361 A1.

The proximity detecting device 7 continuously transmits the current position of an actuating object 12 in the detection region 8 to the control device 3. The control device 3 can change the display on the display surface 2 in dependence upon this signal.

Furthermore, the control device 3 is connected to a storage device 11. Data regarding a hierarchical menu structure is stored in the storage device 11, the menu structure comprising menus in various levels. The hierarchical menu structure comprises a main menu that is displayed when switching on the operator control device 6 or rather when switching on the vehicle 20. This main menu comprises multiple menu points. The menu points are embodied on the display surface 2 as switching elements. If a switching element of this type is actuated, a sub menu, in other words a menu of a hierarchically lower level, is subsequently displayed, the sub menu in each case can comprise multiple menu points. In addition, information can be displayed in the menus or after actuating a menu point, the information being used for the operation of devices of the vehicle or the information displays states of devices of the vehicle.

To generate these displays within the hierarchical menu structure, the control device 3 is in addition coupled to a data bus 5 of the vehicle 20. The control device 3 is connected to further devices 9, 10 of the vehicle 20 by way of this data bus 5 and information regarding the further devices is to be displayed on the display surface 2 or the devices are to be operated by means of the operator control device 6. Information can be displayed to the occupants of the vehicle by means of the operator control device 6 and by means of the method. In addition, the occupants of the vehicle can operate devices 9, 10 of the vehicle 20 by means of the operator control device 6 and can control the display on the display surface 2.

In the case of the disclosed method, a part surface 14 for displaying vehicle-specific information is displayed or displayed as changed in menus of the menu structure if it has been detected that an actuating object 12 is entering the detection region 8 or is exiting the detection region 8. Various examples are explained hereinunder with reference to the FIGS. 4 to 7, as to how this part surface 14 can be displayed:

The display of the menus of the hierarchical menu structure that is known per se is not illustrated in the FIGS. 4 to 7 to more clearly emphasize the particular features of the disclosed method.

Figure 4:
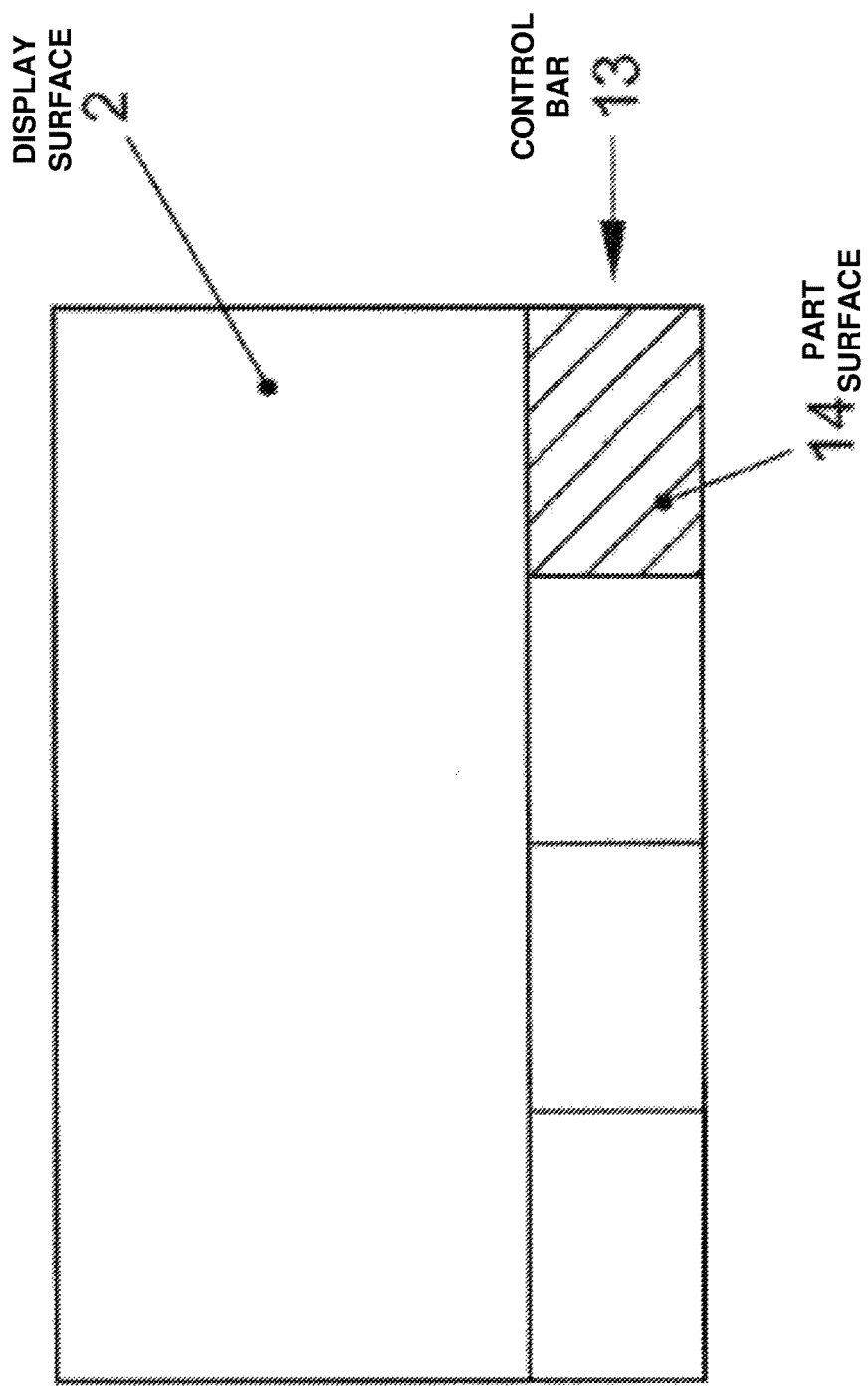

FIG. 4 schematically illustrates a display on the display surface 2 and a control bar 13 is displayed in the lower part of the display surface 2 in the display. A control bar 13 of this type is displayed in the case of a multiplicity of menus of the hierarchical structure. A part surface 14 in which vehicle-specific information is displayed is reserved in this control bar 13. The type of the display within the part surface 14 is identical in particular in the case of all the menus that comprise a control bar 13 of this type. Consequently, it is easier for the viewer to recognize. By way of example, a symbol for a vehicle having an electrical drive is displayed in the part surface 14.

Figure 5:
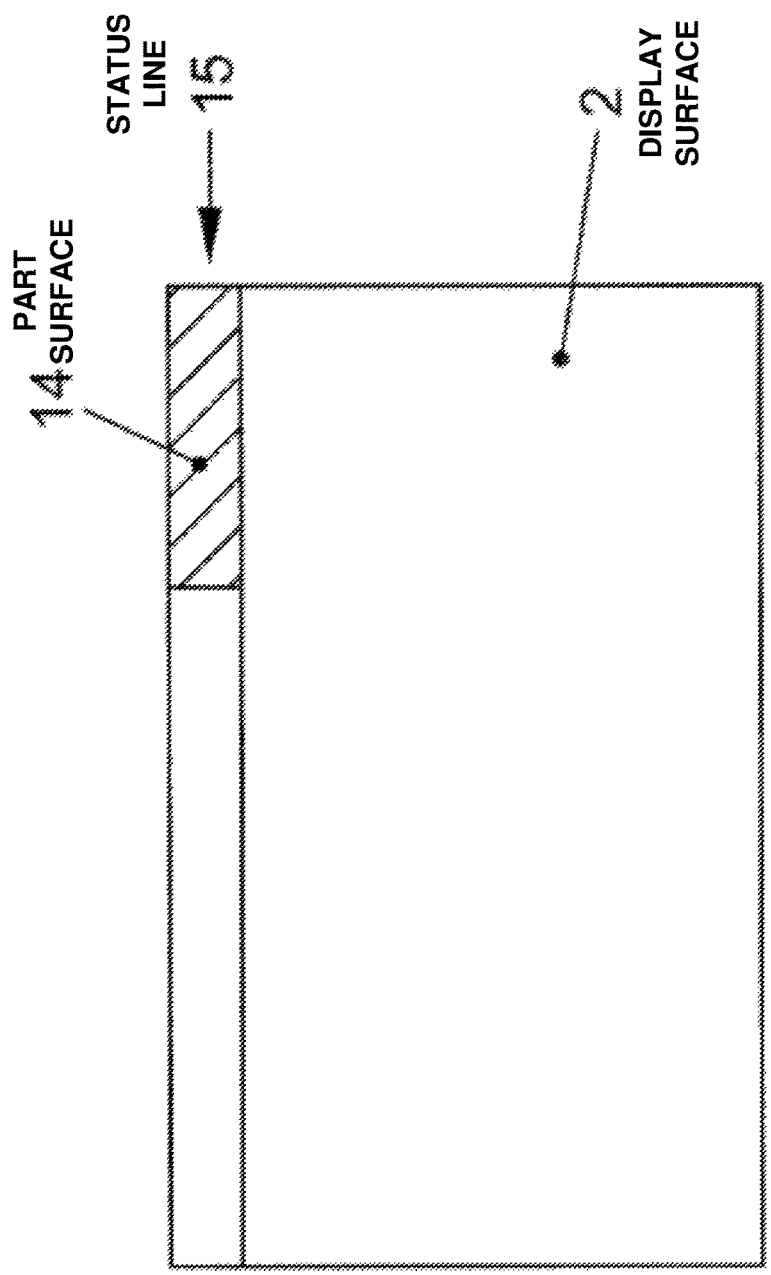

FIG. 5 illustrates a further example for a display that would be generated by the disclosed method. In this case, the menu that is illustrated on the display surface 2 includes a status line 15 that in particular is illustrated in the upper part of the display surface 2. Within the hierarchical menu structure, a multiplicity of menus include a status line 15 of this type. A part surface 14 that is used to display the vehicle-specific information is reserved in this status line 15, as is previously explained with reference to FIG. 4.

Figure 6:
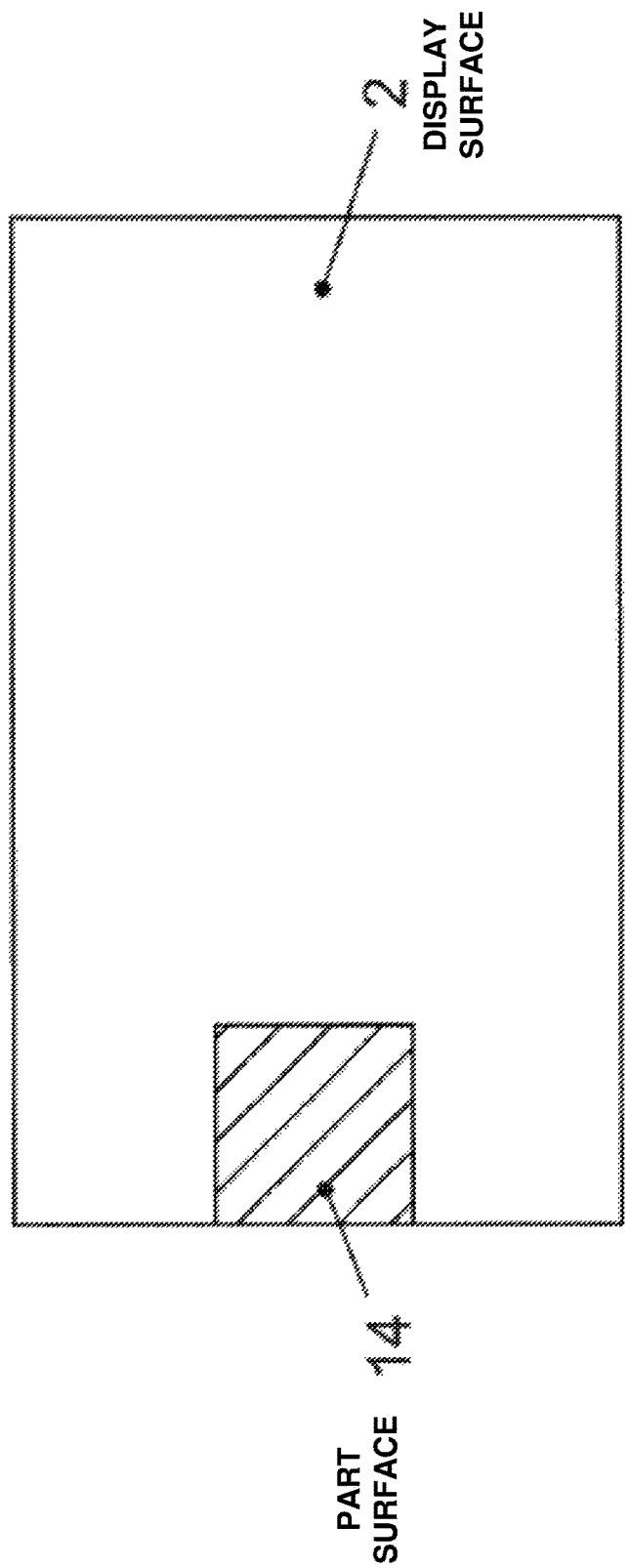

FIG. 6 illustrates on the display surface 2 a further display that is generated by the disclosed method. In this case, a part surface 14 for displaying vehicle-specific information is reserved in each menu of the menu structure. However, this part surface 14 is freely placed on the display surface 2 within the respective menu. However, in particular, the part surface is always the same size so that the part surface can always be easily recognized.

In the case of the embodiment that is illustrated in FIG. 7, the part surface 14 is reserved for displaying vehicle-specific information in the corners of each menu of the menu structure. By way of example, the triangular part surface 14 can comprise in the corners of the display surface 2 a specific color that indicates the vehicle type.

Various exemplary embodiments of the disclosed method that can be implemented by the above described operator control device 6 are explained hereinunder:

In the case of a first exemplary embodiment, the part surface 14 is not initially displayed when displaying a menu. If the user enters the detection region 8 by way of example using a tip of a finger 12, this is detected by the proximity detecting device 7. This device 7 transmits a corresponding signal to the control device 3. The control device 3 interprets this signal as the user intending to perform an operation. Thereupon, the control device 3 generates graphic data for a changed display of the menu. The part surface 14 is integrated into the display of the menu. In the case of the example that is illustrated in FIG. 7, colored corners appear by way of example. In the case of the example that is illustrated in FIG. 6, the part surface 14 is displayed in a region of the display surface 2, the region having space in the corresponding menu. In a situation of this type, the user normally takes into account the display surface 2 and the vehicle-specific information is therefore brought to the attention of the user.

While the tip of a finger 12 of the user is located in the detection region 8 and if necessary the user inputs information on the touch-sensitive surface 4, the part surface 14 is displayed on the display surface 2. As soon as it has been detected that the tip of a finger 12 is no longer located in the detection region 8, the part surface 14 is faded-out so that further space is made available on the display surface 2 for displaying the current menu.

In accordance with a second exemplary embodiment, the part surface 14 is initially not displayed in the menu. Also, if the user enters the detection region 8 with an actuating object 12, the part surface 14 is not displayed. If, however, it has been detected that the actuating object 12, for example the tip of a finger of the user, is exiting the detection region 8, the display surface 2 is faded in as is described above for a specific time interval of for example 5 seconds in the current menu.

In accordance with a third exemplary embodiment, the part surface 14 is always displayed in the menus as is described in FIG. 6 or FIG. 7. If an actuating object 12 is entering the detection region 8, the part surface 14 is displayed as changed. By way of example, the color of the display of the part surface 14 or the transparency of the display can change. In addition or alternatively, the part surface 14 can increase in size. If the actuating object 12 exits the detection region 8, this change is then made in reverse.

If the operator control device 6 does not detect an input within a specific time interval, the length of which is stored in the storage device 11, the previous display disappears and a screensaver is displayed. This screensaver includes the display of vehicle-specific information. If it has been detected that an actuating object 12 is entering the detection region 8, the screensaver disappears and a menu appears, wherein the part surface 14 that displays the vehicle-specific information in another manner is displayed in the menu.

In the case of a fourth exemplary embodiment, the part surface 14 is displayed in all the menus. In this case, however, the change of the part surface 14 only then occurs as described in the third exemplary embodiment if it has been detected that the actuating object 12 is exiting the detection region 8 and indeed for a specific time interval of for example 5 seconds.

In the case of a fifth exemplary embodiment, the part surface 14 is only displayed in specific menus of the hierarchical menu structure. By way of example, the part surface 14 can only be displayed in the case of menus that comprise a control bar 13 as is described in FIG. 4 or in the case of menus that comprise a status line 15 as is described in FIG. 5. In these cases, the part surface 14 is embodied as a switching element on which a symbol is illustrated as vehicle-specific information. If the user actuates the switching element of the part surface 14, wherein the user for example touches this switching element with the tip of their finger 12, the display on the display surface 2 controlled by the control device 3 changes into a state in which the previous menu is no longer displayed and in lieu of the previous menu only vehicle-specific information is still displayed. By way of example, in this case a specific logo or image or lettering appears on the display surface 2. This display can disappear by means of actuating a further switching element or after a specific time interval has expired so that the previous menu is displayed with the part surface 14.

In a vehicle, there are various information and communication devices whose displays and information must be displayed. The size of the display surfaces that can be integrated in the vehicle so that in particular the driver of the vehicle can read the display is very limited. To clearly display the many operator and display possibilities, for example hierarchical menu structures are used. A hierarchical menu structure includes a multiplicity of menus that in each case are allocated various menu points, alphanumerical information displays and/or graphics. When selecting a menu point, a menu of a lower level of the hierarchical menu structure opens, a so-called sub menu. This sub menu in turn comprises multiple sub menu points. This structure can be continued across multiple hierarchical levels so that there are complex ramifications for the display on the display surface.

Despite the complexity of the menu structure, the operator control device in the vehicle is to be operable by the user in a simple and intuitive manner. In addition, it is necessary to impart features of the vehicle type to the occupants of the vehicle, in particular to the driver. By way of example, in the case of a vehicle type having a particularly powerful motor, it is known to tailor the interior and in conjunction therewith also the displays of the operator control device to suit this vehicle type and to differentiate between the vehicle type and vehicles that are in the identical model range but comprise a less powerful motor. In addition, it is necessary to differentiate between vehicles that comprise an electrical drive motor for locomotion with the vehicle and conventional vehicles.

DE 10 2011 116 120 A1 discloses a method for providing an operator control device in a vehicle, wherein graphic data are generated by a control device and the graphic data control a display surface in such a manner that multiple graphic objects can be displayed in at least two display modes. Furthermore, an operating state is defined for the display on the display surface. In the case of the method, an approach of an actuating object is detected in a detection region in front of the display surface and the control device alternates from a display state into the operating state if the actuating object is detected in the detection region.

Illustrative embodiments provide a method and an operating device of the type mentioned in the introduction, wherein information of a menu structure is displayed to the user in such a manner that this information can be easily detected but likewise vehicle-specific information can be conveyed to the user.

LIST OF REFERENCE NUMERALS

1 Display device
2 Display surface
3 Control device
4 Touch-sensitive surface, input device
5 Data bus
6 Operator control device
7 Proximity detecting device
8 Detection range
9 Device of the vehicle
10 Device of the vehicle
11 Storage device
12 Actuating object, tip of a finger
13 Control bar
14 Part surface
15 Status line
20 Vehicle

The invention claimed is:

1. A method for controlling a display surface of an operator control device in a transportation vehicle, the method comprising:
   storing data regarding a menu structure in a storage device, the data including various menus;
   detecting a length of time an actuating object is in a detection region and actuating object position information indicating the position of the actuating object in the detection region, wherein the menus of the menu structure include a part surface for displaying vehicle-specific information on the operator control device display surface;
   displaying or changing the part surface having the vehicle-specific information in the associated menu on the operator control device display surface in response to the detection that the actuating object is entering the detection region or is exiting the detection region,
   wherein inputs for the operator control device are detected via a touch sensitive surface included in the operator control device display surface, a screensaver is displayed on the touch sensitive surface in response to detection that no inputs have been entered by a user via the touch sensitive surface within a third time interval, and the screensaver comprises the display of vehicle-specific information.

2. The method of claim 1, wherein the part surface having the vehicle-specific information is displayed in the associated menu on the operator control device display surface in response to detection that the actuating object being located in the detection region.

3. The method of claim 1, wherein the part surface having the vehicle-specific information is displayed on the operator control device display surface in the associated menu for a first time interval after the actuating object enters the detection region or for a second time interval after the actuating object exits the detection region.

4. The method of claim 1, wherein the operator control device display surface includes a touch sensitive surface and the detection region is arranged in front of the touch sensitive surface such that the position of the actuating object in the detection region is detectable as the actuating object position information, and, wherein the part surface having the vehicle-specific information is displayed or changed in the associated menu in response to detection that the actuating object is approaching the touch sensitive surface or that the actuating object is at a distance from the touch sensitive surface.

5. The method of claim 1, wherein the part surface for displaying the vehicle-specific information is displayed in the displays of all the menus displayed on the operator control device display surface and wherein the display of the vehicle-specific information displayed on the operator control device display device changes in response to detection that the actuating object is entering the detection region and/or is exiting the detection region.

6. The method of claim 1, wherein the part surface for displaying vehicle-specific information on the operator control device display surface is a switching element of the respectively displayed menu of the menu structure, and wherein the vehicle-specific information or further vehicle-specific information is displayed via the operator control device surface in response to detection of a user's actuation of the switching element.

7. An operator control device in a transportation vehicle, the operator control device comprising:
   a display surface;
   a storage device in which data regarding a menu structure that includes various menus are stored;
   a control device coupled to the storage device and to the display surface, wherein the control device controls display of graphic data on the operator control device display surface; and
   a proximity detecting device for detecting a length of time an actuating object is located within a detection region and actuating object position information indicating the position of the actuating object in the detection region, wherein the graphic data includes the menus of the menu structure generated by the control device such that a part surface having vehicle-specific information is displayed or changed in an associated menu in response to detection of an actuating object entering the detection region or exiting the detection region,
   wherein inputs for the operator control device are detected via a touch sensitive surface included in the operator control device display surface, a screensaver is displayed on the touch sensitive surface in response to detection that no inputs have been entered by a user via the touch sensitive surface within a third time interval, and the screensaver comprises the display of vehicle-specific information.

8. The operator control device of claim 7, wherein the operator control device display surface includes a touch sensitive surface, the detection region is arranged in front of the touch sensitive surface such that the position of the actuating object in the detection region is detectable as the actuating object position information by the proximity detecting device.

9. The operator control device of claim 7, wherein the input device includes a touch-sensitive surface.

10. The operator control device of claim 7, wherein the part surface having the vehicle-specific information is displayed in the associated menu on the operator control device display surface in response to detection that the actuating object being located in the detection region.

11. The operator control device of claim 7, wherein the part surface having the vehicle-specific information is displayed on the operator control device display surface in the associated menu for a first time interval after the actuating object enters the detection region or for a second time interval after the actuating object exits the detection region.

12. The operator control device of claim 7, wherein the operator control device display surface includes a touch sensitive surface and the detection region is arranged in front of the touch sensitive surface such that the position of the actuating object in the detection region is detectable as the actuating object position information, and, wherein the part surface having the vehicle-specific information is displayed or changed in the associated menu in response to detection that the actuating object is approaching the touch sensitive surface or that the actuating object is at a distance from the touch sensitive surface.

13. The operator control device of claim 7, wherein the part surface for displaying the vehicle-specific information is displayed in the displays of all the menus displayed on the operator control device display surface and wherein the display of the vehicle-specific information displayed on the operator control device display device changes in response to detection that the actuating object is entering the detection region and/or is exiting the detection region.

14. The operator control device of claim 7, wherein the part surface for displaying vehicle-specific information on the operator control device display surface is a switching element of the respectively displayed menu of the menu structure, and wherein the vehicle-specific information or further vehicle-specific information is displayed via the operator control device surface in response to detection of a user's actuation of the switching element.

* * * * *